(12) United States Patent
Van Zeeland

(10) Patent No.: US 8,485,393 B2
(45) Date of Patent: Jul. 16, 2013

(54) BEVERAGE DISPENSER

(76) Inventor: Gregory Russell Van Zeeland, Norman Park (AU)

( * ) Notice: Subject to any disclaimer, the term of this patent is extended or adjusted under 35 U.S.C. 154(b) by 271 days.

(21) Appl. No.: 12/971,341

(22) Filed: Dec. 17, 2010

(65) Prior Publication Data

US 2011/0168735 A1 Jul. 14, 2011

(30) Foreign Application Priority Data

Dec. 17, 2009 (AU) .................................. 2009906163

(51) Int. Cl.
*B67D 1/00* (2006.01)
(52) U.S. Cl.
USPC ............................. 222/58; 222/129.1; 222/1
(58) Field of Classification Search
USPC .......... 222/58, 55–57, 1, 129.1, 129.4, 145.5, 222/145.6, 141.1, 141.6, 146.1, 146.6, 48.49, 222/50, 129; 62/70, 306, 342
See application file for complete search history.

(56) References Cited

U.S. PATENT DOCUMENTS

| | | | | |
|---|---|---|---|---|
| 3,359,748 A * | 12/1967 | Booth | .............................. | 62/136 |
| 3,642,174 A * | 2/1972 | Cornelius | .................. | 222/129.1 |
| 4,275,567 A * | 6/1981 | Schwitters | ........................ | 62/68 |
| 6,349,852 B1 * | 2/2002 | Ford | .................. | 222/56 |
| 6,446,836 B1 * | 9/2002 | Aalto et al. | ...................... | 222/58 |
| 6,588,458 B2 * | 7/2003 | Rodgers | ............................ | 141/9 |
| 8,123,075 B2 * | 2/2012 | Kadyk | ............................. | 222/64 |
| 8,177,411 B2 * | 5/2012 | Borgstadt | ........................ | 366/15 |

* cited by examiner

*Primary Examiner* — Lien Ngo
(74) *Attorney, Agent, or Firm* — Lando & Anastasi, LLP

(57) ABSTRACT

A beverage dispenser comprising a chamber adapted to contain the beverage to be dispensed, an outlet from the chamber to dispense the beverage, at least one inlet to the chamber for the addition of at least one gas and/or liquid, at least one mass measurement means adapted to determine the mass of the chamber with beverage contained therein, and a controller that determines a quantity of gas and/or liquid to be added to the chamber at least partially determined by the measured mass.

18 Claims, 2 Drawing Sheets

BEVERAGE DISPENSER

CROSS-REFERENCE TO RELATED APPLICATIONS

This application claims priority under 35 U.S.C. §119(a)-(d) to Australian Patent Application No. 2009906163, filed on Dec. 17, 2009, is hereby incorporated by reference.

FIELD OF THE INVENTION

The present invention relates to beverage dispensers. More particularly, the invention relates to refilling frozen carbonated beverage dispensers by means of mass measurement.

BACKGROUND OF THE INVENTION

Frozen carbonated beverages (also known as FCBs) were invented in the 1950s in the USA by Omar Knedik. They are typically semi-frozen in a slush state, and can be eaten with a spoon, or other utensil, and in some cases sucked through a straw. A common FCB is the Slurpee™, which comes in a variety of different flavours and is typically sold at convenience stores. The FCBs are typically made with a syrup which is similar (or in some cases the same as) to the syrup used in regular non-frozen beverage dispensers. In many cases, an emulsifier is added which also helps to prevent the FCB mixture from solidifying when cooled.

Dedicated FCB machines have been implemented which dispense the FCB at the point of sale. The FCB machines have the syrup, water, and $CO_2$ added, which is then mixed and cooled, typically below 0° C. and in most cases to approximately −3° C. The mixture is typically constantly stirred, and scraped from the edges of the chamber it is mixed in, to prevent the mixture solidifying when cooled.

Some FCB machines have a two stage process and others a single stage process. In a two stage process, the gas/liquid mixture is mixed/blended in a blend tank and is then fed to a freezing chamber where the temperature is lowered until ice crystals form in the liquid (and stirred as described above). In a single stage process, the constituents of the gas/liquid mixture are fed directly via valves into a header block and then straight into the freezing chamber.

A common problem associated with FCB machines is that, as the FCB is dispensed, the quantity of FCB within the machine is decreased, and fresh mixture is required to be added to the freezing chamber. Measuring the quantity of mixture, or quantity of the gas/liquid constituents, is important and is typically performed using one of two methods; namely pressure or gravity. In the case of a pressure method, a pressure transducer is provided that measures the pressure in the freezing chamber. As the FCB is removed, the pressure drops and more syrup, water, and $CO_2$ mixture is added to the freezing chamber. Typically a float is provided that floats on the FCB surface and as the FCB is removed, the float lowers. The height of the float (or angle of the float relative to a fixed point) is measured and when it reaches it certain level, more syrup, water, and $CO_2$ mixture is added to the freezing chamber.

Both of these methods have inherent problems that compromise their accuracy. As the $CO_2$ is mixed and absorbed into the water/syrup mixture, the volume of the mixture changes. This change in volume affects both the pressure in the chamber and the level of the FCB in the chamber resulting in the pressure or gravity measurements changing as the $CO_2$ is mixed and absorbed. This can alter the ratio of gas ($CO_2$) to liquid (water and syrup) in the mixture, which can result in inconsistencies in the FCB being dispensed.

It is an aim of this invention to provide an improved beverage dispenser which overcomes or ameliorates one or more of the disadvantages or problems described above, or which at least provides a useful alternative.

It will be clearly understood that any reference herein to background material or information, or to a prior publication, does not constitute an admission that any material, information or publication forms part of the common general knowledge in the art, or is otherwise admissible prior art, whether in Australia or in any other country.

BRIEF SUMMARY OF THE INVENTION

In a first aspect of the invention, there is provided a beverage dispenser comprising:
  a chamber adapted to contain the beverage to be dispensed;
  an outlet from the chamber to dispense the beverage;
  at least one inlet to the chamber for the addition of at least one gas and/or liquid;
  a mass measurement means adapted to determine the mass of the chamber with beverage contained therein; and
  a controller that determines a quantity of gas and/or liquid to be added to the chamber at least partially determined by the measured mass.

Preferably the beverage is a frozen or semi-frozen beverage, and even more preferably the beverage is a frozen carbonated beverage (or 'FCB'). The chamber is preferably a freezing chamber adapted to lower the temperature of the gas and/or liquid added to the chamber, from the inlet. Preferably the outlet is a dispenser outlet with an actuation means to control an amount of beverage dispensed.

The actuation means may provide simple on/off control, or may provide a rate of change control (i.e. so the rate of beverage being dispensed is proportional to the extent which the actuation means is actuated. Preferably the actuation means comprises a pull and/or push handle that is actuated by a user of the dispenser (e.g. a person buying a beverage, a salesperson, or a dedicated operator). Alternatively, the actuation means may be a tap.

The freezing chamber preferably comprises a cooling means to reduce the temperature of the gas and/or liquid contained therein. Preferably the cooling means includes the use of freezer coils, a compressor, and/or heat exchange means, but may include other cooling means, such as thermoelectric elements (e.g. a peltier), whether in combination or in isolation. Preferably, the cooling means surrounds at least a portion of the chamber to provide a cooling effect to the inner surface of the chamber. Preferably where a compressor is utilised, flexible refrigeration tubing will be provided to connect a cooling portion of the cooling means with a heat discharge portion. The cooling means preferably cools the chamber to below 0° C.

The beverage dispenser preferably further comprises a chassis. The chassis preferably contains the chamber within and, even more preferably, the mass measurement means is located between the chamber and the chassis. Even more preferably, the chamber is hingedly engaged with the chassis at one or more hinge points, and there is no fixed/rigid connection between the chamber and the chassis apart from the measurement means and hinge point(s).

Preferably the chassis forms a housing for the beverage dispenser. The chassis may comprise panels which have branding, advertising, messages, instructions for use, and/or the like thereon. The panels may be semi-transparent to allow light to pass therethrough, or to allow the panels to be illuminated. The chassis may be free standing or affixed to, or within, a structure such as a wall. Preferably the chassis is fixedly engaged within a wall, with the outlet, and operation of the actuation means, located on one side, and access to a back end of the beverage dispenser on the other side.

Preferably the mass measurement means comprises at least one load cell. Preferably a load cell is provided at or near a front portion of the chamber and/or at or near a rear portion of the chamber. Even more preferably the front load cell is underneath the chamber supporting the chamber from below, and the rear load cell is above the chamber holding the chamber from above. However, it will be appreciated that other load cell placements may be utilised (e.g. preferably located centrally underneath the chamber or on the side(s) of the chamber). Preferably the load cells are adjacent to, or engaged with the chassis, and opposite a hinge means that hingedly engages the chamber to the chassis at the hinge points. Alternatively, instead of hinge means, a biasing means (e.g. a resilient member such as a spring) may be provided that allows the load cell to measure the effective mass of the chamber (or at least variations in the mass of the chamber). Also instead of a hinge means, a further mass measurement means (e.g. load cell) may be provided.

The mass measurement means may be means capable of measuring actual or effective mass (e.g. a load cell) or may be any suitable means capable of detecting changes in mass. For example, the mass measurement means may be a spring with a switch that is triggered by mass compressing the spring, and released as mass on the spring is decreased. In this regard, preferably the spring and switch are calibrated such that the switch is actuated from one state to the other when a certain predetermined mass is exerted thereon.

Preferably the load cells are electrically connected to the controller. Alternatively the load cells may communicate wirelessly with the controller. In any event, the load cells may either actively send signals to the controller, or the controller may read measurements from the load cells when required (e.g. by polling the load cells). Preferably the controller includes a processor such as a microprocessor or microcontroller. Preferably interface circuitry is provided that connects the microprocessor or microcontroller to the mass measurement means and, optionally, other peripherals such as temperature sensor(s), led(s), display(s), and/or the like.

The load cells measure the mass of the chamber with beverage contained therein. As beverage is dispensed from the outlet the mass will decrease, which is relayed to the controller which preferably calculates the variable difference in mass. As the mass of the chamber is fixed, the only variable in the mass measurement is the content of beverage in the chamber. The controller preferably calculates when to add the gas and/or liquid to the chamber. For example, when a low level limit is reached, the controller may switch an electrical relay which enables the gas and/or liquid to be added to the chamber. The gas and/or liquid is preferably added via a fluid transfer means such as a pump, solenoid valve, or any other suitable mean for adding the gas and/or liquid.

The desired quantity of gas and/or liquid contained within the chamber is at least partially determined by a predetermined overrun (overrun being a percentage yield obtained from a beverage in a semi-frozen state). Preferably the overrun is controlled to be between 70% and 90%. Even more preferably, the overrun is approximately 80%. This results in the dispensed beverage having a resultant volume that is expanded by approximately 80%, primarily due to a determined quantity of gas being added to a determined quantity of liquid.

The liquid may include one or more of water, syrup, or alcohol/spirits. Preferably the liquid is pre-mixed or blended and is added to the chamber as a mixture. The gas preferably includes carbon dioxide ($CO_2$) and/or air, and is pre-mixed/blended with the liquid and is added to the chamber as a mixture.

The gas and/or liquid is preferably pre-mixed/blended in a blend tank. A water-to-syrup ratio may be determined to achieve a desired ratio. For example, a typical ratio is 5 parts water to 1 part syrup which, depending on the syrup, results in the beverage having approximately 13 degrees of brix (sugar content). If spirits are added, a typical ratio is 4.2 parts water to 1 part syrup and 1 part spirit. Typically the spirit has an alcohol content of 37.5%. Preferably the ratio of ingredients (e.g. syrup, water, $CO_2$, and/or the like) is predetermined, and the quantity of each ingredient is preferably measured at the desired ratio when added.

The blend tank, if used, preferably comprises an outlet in connection with the inlet of the chamber. The outlet of the blend tank is preferably the only inlet to the chamber, but it may also be one of two or more inlets to the chamber. Preferably the outlet of the blend tank is connected to the inlet of the chamber by a conduit. Preferably the conduit is a hose and, even more preferably, the hose is a flexible hose. Preferably a blend tank mass measurement means is provided which determines the mass of the blend tank and a mixture of gas(es) and/or liquid(s) being mixed/blended therein.

Preferably the blend tank mass measurement means is also one or more a load cells. The blend tank mass measurement means may be connected to the controller that determines the quantity of gas and/or liquid to be added to the chamber and/or to a second controller that determines the quantity of gas and/or liquid to be added to the blend tank. If more than one controller is provided, the controllers may operate independently or, more preferably, are in communication with each other. If a single controller is provided, a single algorithm which controls the gas and/or liquid to be added to each of the chamber and blend tank may be provided, or different algorithms may be utilised for control of each of the chamber and blend tank.

The blend tank preferably has at least one inlet, and even more preferably adds multiple gasses/liquids in series sequentially (alternatively, the gasses/liquids may be added in simultaneously in parallel). For example, a first liquid is added to a certain preset limit by mass which is calculated by the gross mass of the blend tank, and then a second liquid is added, and so on. When the final liquid is added and a predetermined level is achieved, the controller may then allow the gas/liquid mixture to be drawn from the blend tank. Preferably the drawing/removal of gas/liquid mixture from the blend tank is controlled by the controller that determines the quantity of gas and/or liquid to be added to the chamber.

The drawing/removal of gas/liquid mixture from the blend tank may be beyond the control of the controller for the blend tank, but is preferably controllable at least to the extend that the controller for the blend tank can prevent the gas/liquid mixture from being drawn (i.e. an on/off control). Once the mixture level in the blend tank falls below a preset minimum level, the controller may turn off power to the fluid transfer means (e.g. a pump, solenoid valve, etc.).

Preferably once the preset minimum level is reached the blend tank will begin the process of refilling the tank. The gas/liquid added to the blend tank may be supplied by one or more of a tank, vessel, 'bag in the box', canister, or the like. The mass measurement means of the blend tank can determine the quantity of gas/liquid to be added to the blend tank. For example, if the mass of a blend tank full of mixture is known, the difference in mass between what is measured and the full mass can be determined, and the quantity to be added is preferably the difference. Preferably the ratios of gas/liquid are added by mass. For example, quantities of the gas/liquid being added are measured and added according to a predetermined desired ratio.

Where a blend tank is not provided, the gas/liquid is preferably added to the chamber in the same manner as added to the blend tank. For example, the gas/liquid may be added to the chamber via the inlet(s) to the chamber, the gas/liquid being added either in series (e.g. sequentially) of in parallel (e.g. simultaneously). Preferably the quantities of gas/liquid to be added are determined, at least partially, by mass.

The beverage dispenser preferably further comprises a beating means in the chamber. Preferably the beating means is driven by a powered source such as, for example, an electric motor. Preferably the beating means comprises a scraper adapted to scrape frozen beverage from the walls of the chamber and/or to stir the mixture to keep it uniformly mixed. Preferably the chamber contains the mixture at a pressure (e.g. up to 40 psi). The combination of the pressure, sugar content (brix), and constant stirring by the beating means prevents the beverage contained within the chamber from freezing solid.

In a second aspect of the invention, there is provided a method of controlling a quantity of gas and/or liquid to be added to a beverage dispenser, the method comprising the steps of:

measuring the mass of a chamber with a beverage to be outlet contained therein;

determining a quantity of gas and/or liquid to be added to the chamber at least partially determined by the measured mass; and adding the determined quantity of gas and/or liquid to the chamber.

Preferably the method further comprises the step of:

measuring the mass of a blend tank, wherein the blend tank has an outlet connected to an inlet of the chamber, the determined quantity of gas and/or liquid being added to the chamber from the blend tank.

The step of determining a quantity of gas and/or liquid to be added to the chamber preferably comprises calculating a variation in mass of the chamber with beverage contained therein. Preferably this step is conducted in a controller.

Preferably the quantity of gas and/or liquid to be added to the chamber is entirely determined by the measured mass of the chamber with the beverage therein.

In order that the invention may be more readily understood and put into practice, one or more embodiments thereof will now be described, by way of example only, with reference to the accompanying drawings.

DETAILED DESCRIPTION OF THE INVENTION

Figure 1:
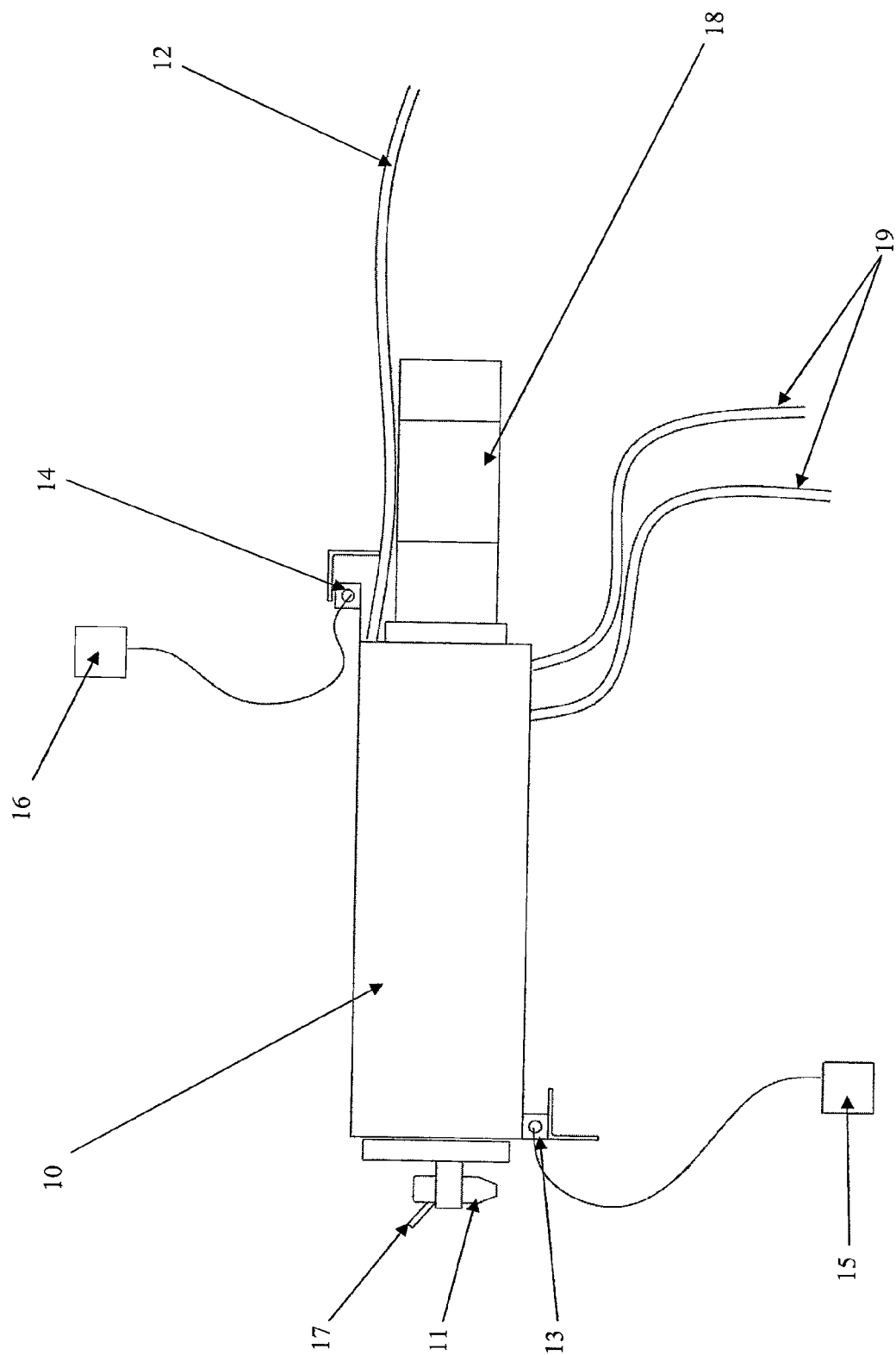
FIG. 1 illustrates a diagrammatic side elevation view of an embodiment of the invention.

Illustrated in FIG. 1 is a frozen carbonated beverage (FCB) dispensing machine. The machine has a freezing chamber 10, a beverage outlet 11, an inlet 12, mass measurement means in the form of a load cell 13 or 14, and a respective control unit 15 or 16. The beverage outlet 11 dispenses beverage when a lever 17 is actuated by a user. The user may be a person consumer and/or purchasing the beverage, or may be a shop assistant or an operator, or the like. The lever 17 preferably actuates a valve and the rate of flow of the beverage from the outlet is preferably proportional to the distance the lever is actuated (e.g. by pulling or pushing).

The freezing chamber 10 has an internal chamber which contains the FCB within, and a cooling means surrounding the chamber which freezes the FCB in the chamber and maintains the FCB at or near a desired temperature (typically less than 0° C. and in most cases around approximately −3° C.). The cooling means comprises a refrigeration system which includes flexible refrigeration tubing 19.

As the cooling means lowers the temperature of the chamber, the FCB contained within starts to freeze to the sides of the chamber. A beating means (not shown) within the chamber rotates, powered by a motor 18. The beating means has a scraper that scrapes the frozen beverage from the sides of the chamber walls and also constantly stirs the FCB mixture contained in the chamber to prevent freezing and to keep it uniformly mixed.

The mass of the freezing chamber 10 with the FCB contained therein is measured via a load sensor 13 or 14. It is envisaged that only one load sensor 13 or 14 will be required, and at the location of the other, a hinging means will be provided to hinge the freezing chamber 10 to a chassis (not shown) within which the freezing chamber 10 is located. There are no fixed/rigid points between the freezing chamber 10 and the chassis, and the connection between the two is in the form of only the load cell(s) and the hinging means. As the hinging means is diagonally opposite the load cell 13 or 14, the mass of the entire freezing chamber with FCB contained therein can be measured accurately and consistently.

Figure 2:
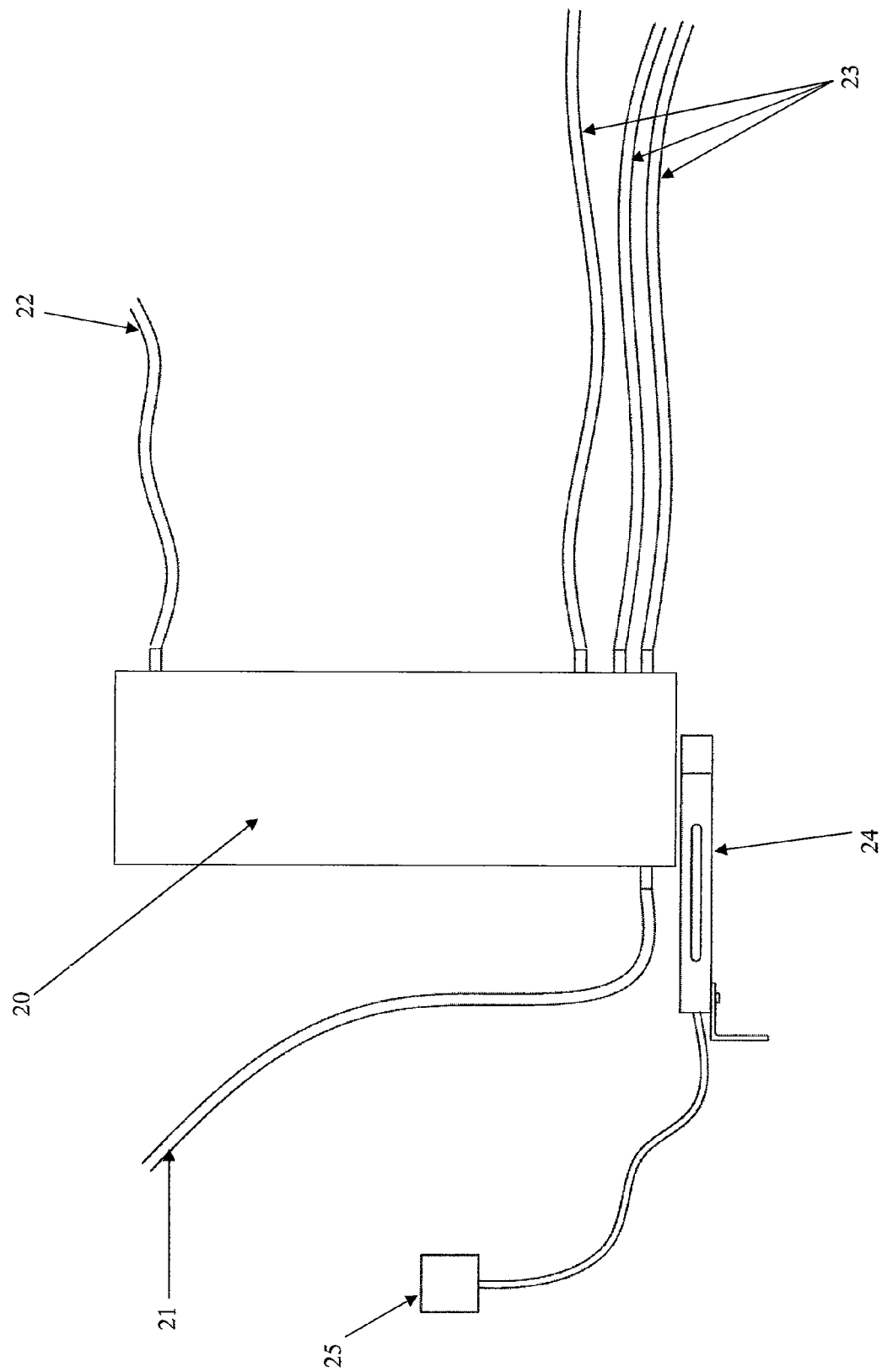
FIG. 2 illustrates a diagrammatic side elevation view of a blend tank used in an embodiment of the invention.

As FCB is dispensed from the freezing chamber 10 through the outlet 11, the contents of the chamber 10 decreases. This is measured by the load cell 13 or 14 which relays the mass of the freezing chamber 10 and contents to a controller associated with the load cell 15 or 16. The controller 15 or 16 thereby determines the quantity of FCB mixture required to be inlet into the freezing chamber 10 via the inlet 12. The inlet 12 is a flexible tubing which FCB mixture is transferred through. Although a single flexible tube is illustrated, more than one tube may be implemented, particularly in cases where different ingredients of the FCB mixture are inserted independently (i.e. down different tubes). In the illustrated embodiment, a single flexible tube is provided as the FCB ingredients are mixed in a blend tank 20, illustrated in FIG. 2.

The blend tank 20 has an outlet 21 that is in fluid communication with the inlet 12 of the freezing chamber 10. As FCB mixture is outlet from the blend tank 20 through the outlet 21 it is inlet to the freezing chamber 10 through inlet 12. The blend tank 20 has an upper flexible hose 22 for venting, receiving $CO_2$ and/or air. The blend tank 20 also has lower flexible hoses 23 for receiving liquids to be blended such as syrup, water, and/or spirits (alcohol). Typically the blend tank 20 will receive water, syrup and $CO_2$ and blend them according to a predetermined ratio. The predetermined ratio will usually be determined by the syrup and a desired overrun percentage for the FCB.

A typical syrup to water ratio is 5 parts water to 1 part syrup which, depending on the syrup, has approximately 13 degrees of brix (sugar content). In alcoholic FCBs, spirit is added and a typical ratio would be 4.2 parts water to 1 part syrup and 1 part spirit (which typically has an alcohol percentage of 37.5%). Overrun is a percentage of yield achieved after pouring a drink in its finished semi-frozen state. A typical overrun percentage is 80% which means the drink is expanded in volume by 80%. In this regard, after a full cup of FCB drink melts, the cup is approximately 55% full of unfrozen liquid (being primarily the liquid constituents of the FCB mixture). The overrun is primarily achieved from the process of adding $CO_2$ to the FCB mixture prior to, or during, freezing of the mixture whilst the beater motor 18 drives the scraper blades continuously over the freeze chamber 10 walls.

As mixture is transferred from the blend tank 20 to the freezing chamber 10 (via outlet 21 and inlet 12), the level of mixture in the blend tank 20 is decreased. Similarly to the mass measurement of the freezing chamber 10, a load cell 24 is provided underneath the blend tank which determines a change in mass. The load cell 24 is connected to a control unit 25 which measures changes in mass in the blend tank 20, with mixture contained therein, and can restrict or shut off power to the outlet 21 (e.g. to a pump, or similar) and/or begin a refilling process.

During the refilling process gas and/or liquid is added to the blend tank via the flexible hoses 22 and 23. The refilling process may be initiated when the blend tank is either partially empty or completely empty. When a source of gas/liquid is depleted, the controller may issue an empty or refill signal indicating that the depleted source needs replacement. When refilling, the blend tank 20 (or the control unit 25 associated with the blend tank 20) may prevent outlet of the mixture from the blend tank 20. The quantities of gas/liquid being added to the blend tank 20 are measured, preferably by mass, to the predetermined ratio. The measured quantities of gas/liquid are then added and, assuming the mixture in the blend tank 20 (if any) was already at the predetermined ratio, the refilled mixture will also be at the predetermined ratio.

The control unit 25 may be a separate controller to control unit 15 or 16, or may be the same control unit. If control units 25 and 15 or 16 are separate control units, the units may operate independently or in communication with each other. If a single control unit is provided then a single algorithm which controls the gas and/or liquid to be added to each of the freezing chamber 10 and blend tank 20 may be provided, or different algorithms may be utilised for control of each of the freezing chamber 10 and blend tank 20 independently.

It is to be understood that the terminology employed above is for the purpose of description and should not be regarded as limiting. Although the invention has been described primarily in relation to frozen carbonated beverages (FCBs) it is envisaged that the invention could also be used in relation to other types of beverage dispensers (e.g. standard non-frozen liquid beverage dispensers).

The foregoing embodiments are illustrative only of the principles of the invention, and various modifications and changes will readily occur to those skilled in the art. The invention is capable of being practiced and carried out in various ways and in other embodiments. It is also to be understood that the terminology employed herein is for the purpose of description and should not be regarded as limiting.

In the present specification and claims (if any), the word "comprising" and its derivatives including "comprises" and "comprise" include each of the stated integers but does not exclude the inclusion of one or more further integers.

Reference throughout this specification to "one embodiment", or "an embodiment" means that a particular feature, structure, or characteristic described in connection with the embodiment is included in at least one embodiment of the present invention. Thus, the appearance of the phrases "in one embodiment" or "in an embodiment" in various places throughout this specification are not necessarily all referring to the same embodiment. Furthermore, the particular features, structures, or characteristics may be combined in any suitable manner in one or more combinations.

In compliance with the statute, the invention has been described in language more or less specific to structural or methodical features. It is to be understood that the invention is not limited to specific features shown or described since the means herein described comprises preferred forms of putting the invention into effect. The invention is, therefore, claimed in any of its forms or modifications within the proper scope of the appended claims (if any) appropriately interpreted by those skilled in the art.

The invention claimed is:

1. A frozen carbonated beverage dispenser comprising:
   a pressure chamber adapted to contain a controlled amount of the frozen carbonated beverage to be dispensed as well as a controlled amount of carbonating gas;
   an outlet from the pressure chamber to dispense the frozen carbonated beverage;
   at least one inlet to the pressure chamber for the addition of at least one carbonating gas and/or replacement liquid to be frozen and carbonated to form the frozen carbonated beverage;
   at least one mass measurement means adapted to determine the mass of the pressure chamber with frozen carbonated beverage contained therein and determine the amount of frozen carbonated beverage in the pressure chamber; and
   a controller that determines a quantity of gas and/or liquid to be added to the pressure chamber at least partially determined by the measured mass to maintain a predetermined ratio of frozen carbonated beverage relative to carbonating gas in the pressure chamber.

2. A frozen carbonated beverage dispenser as claimed in claim 1, further comprising an actuation means for controlling the amount of frozen carbonated beverage to be dispensed.

3. A frozen carbonated beverage dispenser as claimed in claim 2, wherein the rate of frozen carbonated beverage being dispensed is proportional to the extent which the actuation means is actuated.

4. A frozen carbonated beverage dispenser as claimed in claim 1, wherein the mass measurement means comprises at least one load cell.

5. A frozen carbonated beverage dispenser as claimed in claim 1, further comprising a blend tank for blending the gas and/or liquid to be added to the pressure chamber.

6. A frozen carbonated beverage dispenser as claimed in claim 1, further comprising a beating means for agitating the frozen carbonated beverage.

7. A frozen carbonated beverage dispenser as claimed in claim 6, wherein the beating means comprises a scraper.

8. A frozen carbonated beverage dispenser as claimed in claim 7, wherein the scraper is adapted to scrape frozen beverage from at least one wall of the pressure chamber.

9. A frozen carbonated beverage dispenser as claimed in claim 7, wherein the scraper is adapted to stir the beverage.

10. A frozen carbonated beverage dispenser as claimed in claim 1, wherein the frozen carbonated beverage is a frozen or semi-frozen beverage.

11. A frozen carbonated beverage dispenser as claimed in claim 1, wherein the pressure chamber comprises a cooling means to moderate the temperature of the frozen carbonated beverage.

12. A method of controlling a quantity of gas and/or liquid to be added to a frozen carbonated beverage dispenser, the method comprising the steps of:
    measuring the mass of a pressure chamber with a frozen carbonated beverage to be outlet contained therein;

determining a quantity of carbonating gas and/or liquid to be frozen and carbonated to form the frozen carbonated beverage to be added to the pressure chamber at least partially determined by the measured mass; and adding the determined quantity of carbonating gas and/or liquid to be frozen and carbonated to form the frozen carbonated beverage to the pressure chamber.

13. A method as claimed in claim 12, further comprising the steps of:

measuring the mass of a blend tank; and determining an amount of carbonating gas and/or liquid to be frozen and carbonated to form the frozen carbonated beverage in the blend tank.

14. A method as claimed in claim 13, wherein the determined quantity of carbonating gas and/or liquid to be frozen and carbonated to form the frozen carbonated beverage being added to the pressure chamber is from the blend tank.

15. A method as claimed in claim 12, wherein the step of determining the quantity of carbonating gas and/or liquid to be frozen and carbonated to form the frozen carbonated beverage to be added to the pressure chamber comprises:

calculating a variation in mass of the pressure chamber with frozen carbonated beverage contained therein.

16. A method as claimed in claim 12, wherein the mass of the pressure chamber is measured by at least one load sensor.

17. A method as claimed in claim 13, wherein the mass of the blend tank is measured by at least one load sensor.

18. A method as claimed in claim 13, wherein quantities of carbonating gas and/or liquid to be frozen and carbonated to form the frozen carbonated beverage are added to the blend tank according to a predetermined ratio.

* * * * *